(12) United States Patent
Chen

(10) Patent No.: US 10,261,608 B2
(45) Date of Patent: Apr. 16, 2019

(54) CURSOR CONTROL METHOD AND CURSOR CONTROL SYSTEM

(71) Applicants: Inventec (Pudong) Technology Corporation, Shanghai (CN); INVENTEC CORPORATION, Taipei (TW)

(72) Inventor: Cheng-Hsin Chen, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/849,603

(22) Filed: Dec. 20, 2017

(65) Prior Publication Data

US 2019/0018503 A1 Jan. 17, 2019

(30) Foreign Application Priority Data

Jul. 12, 2017 (CN) .......................... 2017 1 0563607

(51) Int. Cl.
| | | |
|---|---|---|
| *G06F 3/033* | (2013.01) | |
| *G06F 3/038* | (2013.01) | |
| *G06F 3/0488* | (2013.01) | |
| *G06F 3/0354* | (2013.01) | |

(52) U.S. Cl.
CPC .......... *G06F 3/038* (2013.01); *G06F 3/03547* (2013.01); *G06F 3/04883* (2013.01)

(58) Field of Classification Search
CPC .. G06F 3/0213; G06F 3/0334; G06F 3/04892; G06F 1/169; G09G 2356/00
See application file for complete search history.

(56) References Cited

U.S. PATENT DOCUMENTS

| | | | |
|---|---|---|---|
| 2012/0052920 A1* | 3/2012 | Kobayashi ........ | H04M 1/72519 455/566 |
| 2012/0151412 A1* | 6/2012 | Mine ....................... | G06F 1/169 715/810 |
| 2014/0009394 A1* | 1/2014 | Lee ...................... | H04N 5/4403 345/157 |
| 2014/0145988 A1* | 5/2014 | Ishizawa ................ | H04L 67/06 345/173 |
| 2015/0347010 A1* | 12/2015 | Yang ..................... | H04L 67/025 715/765 |
| 2016/0121209 A1* | 5/2016 | Yoshino ................. | A63F 13/26 463/32 |
| 2016/0188078 A1* | 6/2016 | Hsu ....................... | G06F 3/0416 345/158 |

\* cited by examiner

*Primary Examiner* — Roy P Rabindranath
(74) *Attorney, Agent, or Firm* — CKC Partners Co., LLC

(57) ABSTRACT

A cursor control method is disclosed. The cursor control method is applicable for a touch device and a display device, in which the display device includes a virtual touch area corresponding to a touch area of the touch device. The control method includes the following operations; detecting a click position in the touch area during a click operation; calculating a virtual click coordinate position corresponding to the click coordinate position in the virtual touch area; and performing the click operation at the virtual click coordinate position on the display device.

9 Claims, 4 Drawing Sheets

CURSOR CONTROL METHOD AND CURSOR CONTROL SYSTEM

CROSS-REFERENCE TO RELATED APPLICATION

This application claims the priority benefit of CHINA Application serial no. 201710563607.4, filed Jul. 12, 2017, the full disclosure of which is incorporated herein by reference.

FIELD OF INVENTION

The invention relates to a cursor control method and a cursor control system. More particularly, the invention relates to a cursor control method and a cursor control system for click-based operation of the cursor.

BACKGROUND

Mouse and touchpad interface for a computer commonly used devices for moving a cursor and click-based operation. Whether it is a touch-controlled mouse or a general mouse, when the user wants to move the cursor, the user moves the mouse so that the motion detection unit detects that the mouse movement relative to the desktop and moves the cursor in the computer, or the user slides a finger on the touchpad to move the cursor. If the user moves the mouse to the target location and the user needs to perform a click operation, user needs to accurately move the cursor to the button and then perform the click operation. Sometimes the cursor will be close enough to a target location, the user needs to adjust the mouse position, which might require slight movement, so that the cursor may accurately reach the specified button position to click, which is a waste of time and the requires an increasing amount of wrist action.

Therefore, how to save the user's wrist movement and operation time when the user moves the mouse and performs click-based operations are problems that are needed to be addressed in the art.

SUMMARY

An embodiment of this disclosure is to provide a cursor control method. The cursor control method is applicable for a touch device and a display device, in which the display device includes a virtual touch area corresponding to a touch area of the touch device. The control method includes the following operations: detecting a click position in the touch area during a click operation; calculating a virtual click coordinate position corresponding to the click coordinate position in the virtual touch area; and performing the click operation at the virtual click coordinate position on the display device.

An embodiment of this disclosure is to provide a cursor control system. The cursor control system includes a touch device, a display device and a processor. The touch device is configured to detect a click coordinate position in a touch area of the touch device during a click operation. The display device includes a virtual touch area corresponding to the touch area of the touch device. The processor is configured to calculate a virtual click coordinate position corresponding to the click coordinate position in the virtual touch area and performing the click operation on the virtual click coordinate position on a screen of the display device.

Therefore, according to the technical concept of the present invention, embodiments of this disclosure are to provide a cursor control method and a cursor control system, and in particular, a cursor control method and a cursor control system for click operation of the cursor, so as to effectively save the user's wrist movement and operation time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
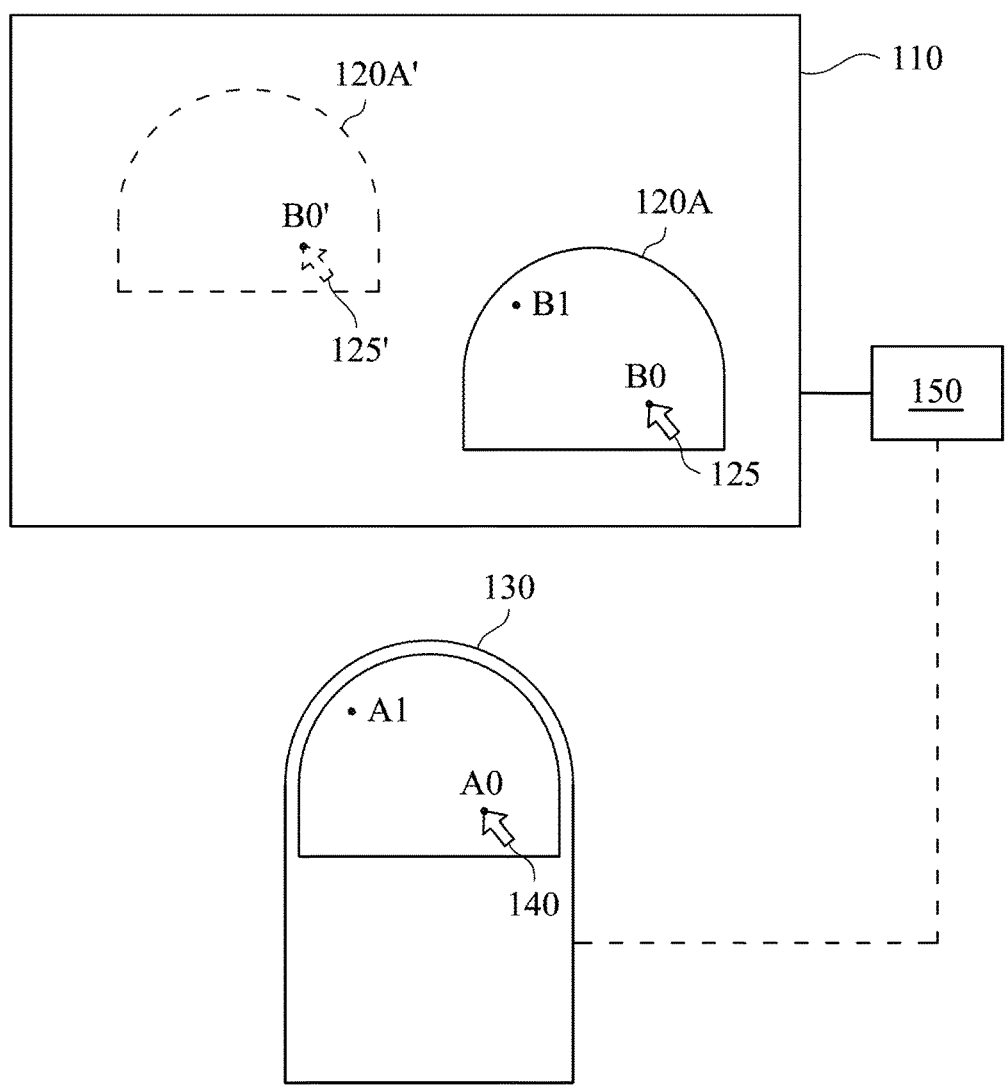
FIG. 1A is a schematic diagram illustrating a cursor control system according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1A. FIG. 1A is a schematic diagram illustrating a cursor control system 100A according to some embodiments of the present disclosure. The cursor control system 100A includes a display device 110, a touch device 130, and a processor 150. The processor 150 is coupled to the display device 110. The processor 150 is electrically connected to the touch device 130. In some embodiments of the present disclosure, the processor 150 is coupled to the touch device 130 through a communication circuit (not shown) for communicating information to each other. The processor 150 and the touch device 130 may communicate via a wired communication interface and/or a wireless communication interface.

As illustrated in FIG. 1A, the touch device 130 includes a touch area 140. The operation of the user within the touch area 140 may be detected by the touch device 130. The display device 110 includes a virtual touch area 120A. The cursor 125 is located within the virtual touch area 120A.

The touch device 130 detects a click operation within the touch area 140 and transmits the click coordinate position of the click operation to the processor 150. The processor 150 calculates the virtual click coordinate position corresponding to the click coordinate position within the virtual touch area 120A. Then, the processor 150 performs a click operation at the virtual click coordinate position of the display device 110.

For example, when the user performs a click operation at the coordinate position A1, the touch device 130 detects a click operation at the coordinate position A1 and transmits the click coordinate position A1 to the processor 150. The processor 150 calculates the virtual click coordinate position B1 corresponding to the click coordinate position A1 in the virtual touch area 120A. Then, the processor 150 performs a click operation at the virtual click coordinate position B1 of the display device 110. The detailed calculation method will be described later with FIG. 2 and FIG. 3.

Figure 1B:
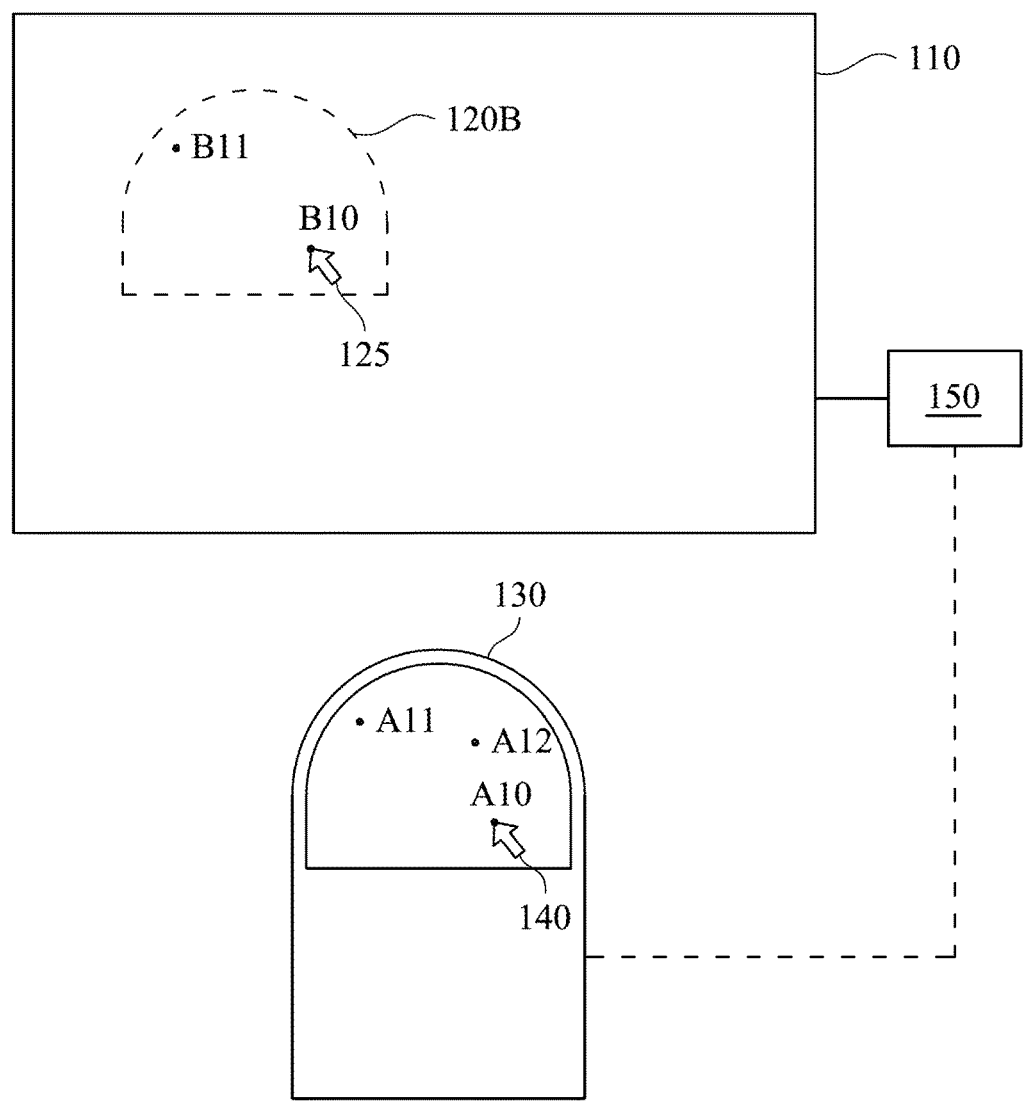
FIG. 1B is a schematic diagram illustrating a cursor control system according to some embodiments of the present disclosure.

Reference is made to FIG. 1B. FIG. 1B is a schematic diagram illustrating a cursor control system 100B according to some embodiments of the present disclosure. The cursor control system 100B shown in FIG. 1B is substantially the same as the cursor control system 100A of FIG. 1A. Only the virtual touch area 120B is different from the virtual touch area 120A. In the cursor control system 100B, the virtual touch area 120B (shown in dotted lines) is not displayed on the display device 110. In the cursor control system 100A, the virtual touch area 120A (shown in solid lines) is displayed on the display device 110.

The touch device 130 detects a click operation within the touch area 140 and transmits the click coordinate position of the click operation to the processor 150. The processor 150 calculates the virtual click coordinate position within the virtual touch area 120B corresponding to the click coordinate position. Then, the processor 150 performs a click operation at the virtual click coordinate position of the display device 110.

For example, when the user performs a click operation at the coordinate position A11, the touch device 130 detects a click operation at the coordinate position A11 and transmits the click coordinate position A11 to the processor 150. The processor 150 calculates the virtual click coordinate position B11 corresponding to the click coordinate position A11 in the virtual touch area 120B. Then, the processor 150 performs a click operation at the virtual click coordinate position B11 of the display device 110. The detailed calculation will be described later with FIG. 2 and FIG. 3.

Figure 2:
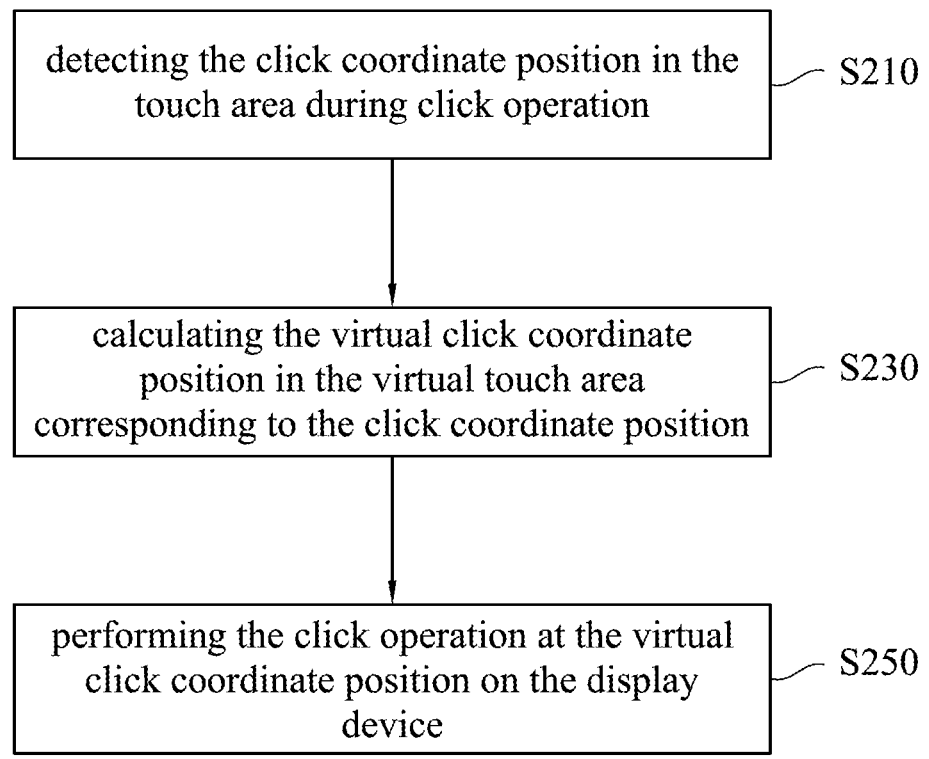
FIG. 2 is a flow chart illustrating a cursor control method according to some embodiments of the present disclosure.

Reference is made to FIG. 2. FIG. 2 is a flow chart illustrating a cursor control method 200 according to some embodiments of the present disclosure. As shown in FIG. 2, the cursor control method 200 includes the following operations:

S210: detecting the click coordinate position in the touch area during click operation;

S230: calculating the virtual click coordinate position in the virtual touch area corresponding to the click coordinate position; and S250: performing the click operation at the virtual click coordinate position on the display device.

In order to make the cursor control method 200 of the present embodiment easy to understand, reference is made to FIG. 1A, FIG. 1B, and FIG. 2 together.

In operation S210, detecting the click coordinate position in the touch area during the click operation. For example, in some embodiments, when the user performs a click operation in the touch area 140, the touch device 130 detects a click coordinate position in the touch area 140.

In operation S230, calculating the virtual click coordinate position corresponding to the click coordinate position in the virtual touch area. In some embodiments, operation S220 may be performed by processor 150. The detailed execution method of the operation S220 will be described below with reference to FIG. 3.

Figure 3:
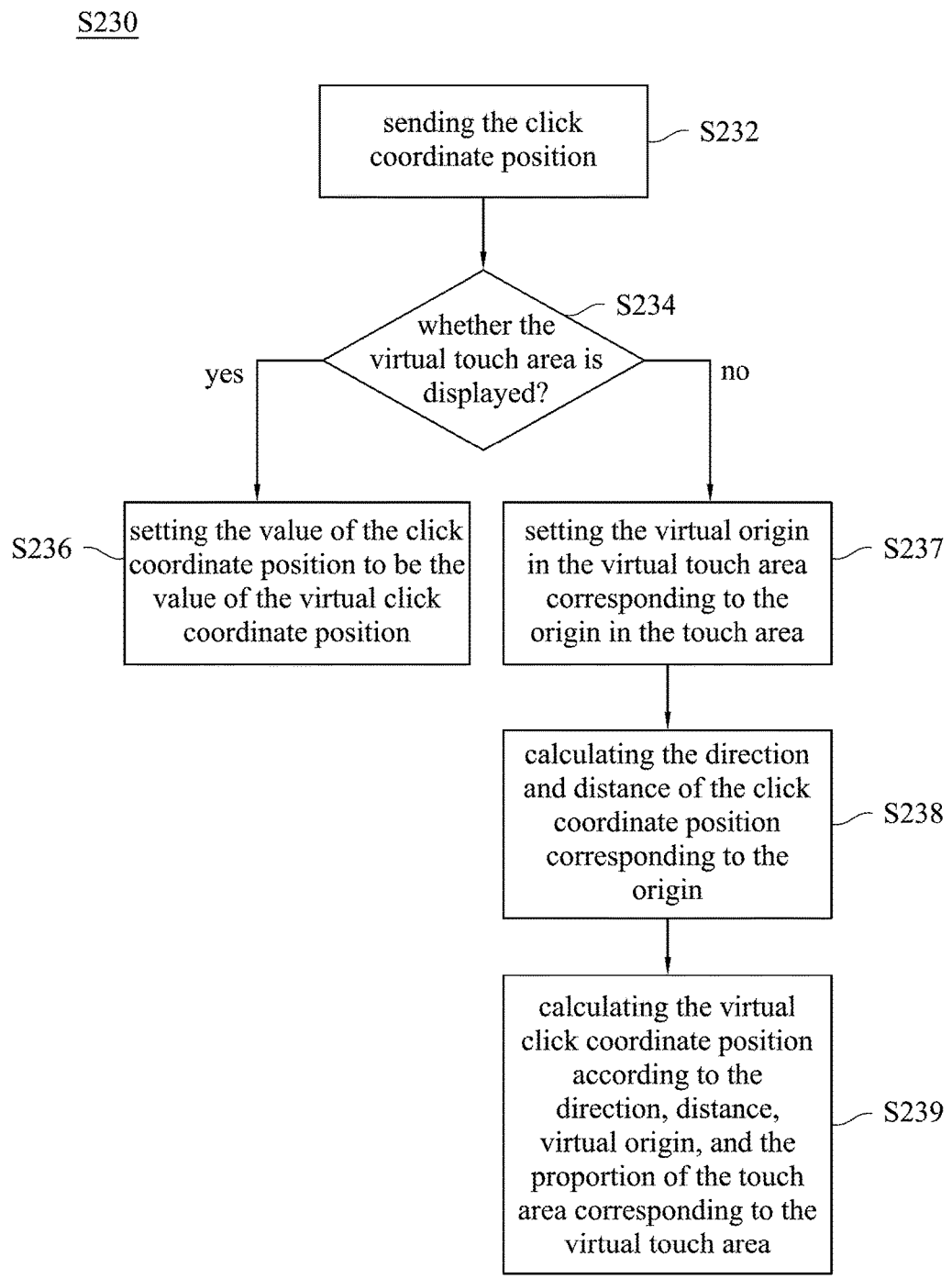
FIG. 3 is a flow chart illustrating one of the operations in FIG. 2 according to some embodiments of the present disclosure.

Reference is made to FIG. 3. FIG. 3 is a flowchart illustrating operation S230 in FIG. 2 according to some embodiments of the present disclosure. As shown in FIG. 3, operation S230 includes the following operations:

S232: sending the click coordinate position;

S234: determining whether the virtual touch area is displayed or not;

S236: setting the value of the click coordinate position to be the value of the virtual click coordinate position;

S237: setting the virtual origin in the virtual touch area corresponding to the origin in the touch area;

S238: calculating the direction and distance of the click coordinate position corresponding to the origin; and S239: calculating the virtual click coordinate position according to the direction, distance, virtual origin, and the proportion of the touch area corresponding to the virtual touch area.

In operation S232, sending the click coordinate position. For example, in some embodiments, the touch device 130 transmits the detected click coordinate position to the processor 150.

In operation S234, determining whether the virtual touch area is displayed or not. In some embodiments, operation S234 is performed by processor 150. For example, in the cursor control system 100A, the processor 150 determines that the virtual touch area 120A is displayed, whereas in the cursor control system 100B, the processor 150 determines that the virtual touch area 120B is not displayed. If it is determined in operation S234 that the virtual touch area 120A 120B is displayed, operation S236 is executed. If it is determined in operation S234 that the virtual touch area 120A/120B is not displayed, operation S237 is executed.

In operation S236, setting the value of the click coordinate position to be the value of the virtual click coordinate position. Reference is made to FIG. 1A. For example, if the value of the click coordinate position A0 is (X0, Y0), the value of the virtual click coordinate position B0 is set to (X0, Y0). That is, if the click coordinate position A0 is located at (X0, Y0) of the touch area 140, the virtual click coordinate position B0 is located at (X0, Y0) of the virtual touch area 120A. In some embodiments, operation S236 is performed by processor 150.

In operation S237, setting the virtual origin in the virtual touch area corresponding to the origin in the touch area. Reference is made to FIG. 1B. For example, the coordinate position A10 set in the touch area 140 is the coordinate position A10 of the origin and the coordinate position B10 in the virtual touch area 120B is set as the coordinate position B10 of the virtual origin. The value of the coordinate position B10 of the virtual origin is not necessarily the same as the value of the coordinate position A10 of the origin. In some embodiments, operation S237 is performed by processor 150.

In some embodiments, the coordinate position of the origin A10 is the coordinate position where the user most frequently performs a click operation within the touch area 140. When the coordinate position of the virtual origin is set, the coordinate position at which the cursor 125 is located is detected by the touch device 130 before the click operation is detected. For example, if the touch device 130 detects that before the click operation the cursor 125 is at the coordinate position B10, the coordinate position B10 is set as the coordinate position B10 of the virtual origin.

In some embodiments, the coordinate position of the origin A10 is the coordinate position of the end point of the sliding operation the user performs within the touch area 140. For example, if the touch device 130 detects that the user has slid to the coordinate position A10 from the coordinate position A12 on the touch area 140, the start point coordinate position A12 and the end point coordinate position A10 are determined. Then, the end point coordinate position A10 is set as the coordinate position A10 of the origin. When the coordinate position of the virtual origin is set, the coordinate position at which the cursor 125 is located is detected by the touch device 130 before the click operation is detected. That is, when the touch device 130 detects that the slide operation is completed, if the cursor 125 is located at the coordinate position B10, the coordinate position B10 is set as the coordinate position B10 of the virtual origin.

In operation S238, calculating the direction and distance of the click coordinate position corresponding to the origin. In some embodiments, operation S238 is performed by processor 150. For example, if the coordinate position of the origin is A10 and the click coordinate position is the coordinate position A11, the processor 150 calculates the direction and distance of the coordinate position A11 with respect to the coordinate position A10.

In operation S239, calculating the virtual click coordinate position according to the direction, distance, virtual origin, and the proportion of the touch area corresponding to the virtual touch area. In some embodiments, operation S239 is performed by processor 150. For example, the virtual click coordinate position B11 having the same direction and distance with respect to the coordinate position B10 of the virtual origin is calculated based on the direction and the distance of the click coordinate position A11 with respect to the origin coordinate position A10. In some embodiments, the virtual touch area has a proportion value corresponding to the touch area, for example, the virtual touch area may be 1 times, 1.5 times, or twice the touch area. For example, if the proportion value of the virtual touch area corresponds to the touch area is 2, a virtual click coordinate position B11 having the same direction and a double distance with respect to the coordinate position 1310, which is the virtual origin, is calculated, according to the direction and the distance of the click coordinate position A11 with respect to the origin coordinate position A10.

Reference is made to FIG. 2 again. In operation S250, performing the click operation at the virtual click coordinate position on the display device. For example, if the virtual click coordinate position is the coordinate position B11, the click operation is performed at the coordinate position B11 on the display device 110. In some embodiments, operation S250 is performed by processor 150.

In some embodiments, the user may set whether to display the virtual touch area 120A/120B on the display device 110. The display mode of the virtual touch area 120A/120B may be a translucent mode, with a corner frame, or other lines which do not affect the recognition of the screen. The present disclosure is not limited to the above.

In some embodiments, the user may set the proportion of the virtual touch area 120A/120B corresponding to the touch area 140. In some embodiments, after the user sets the proportion of the virtual touch area 120A/120B corresponding to the touch area 140, the processor 150 adjusts the proportion of the virtual touch area 120A/120B corresponding to the touch area 140.

In some embodiments, the cursor 125 does not move when the user performs a click operation, the touch device 130 detects a click operation, and the processor 150 performs a click operation. That is, the cursor 125 displayed on the display device 110 stays at a position before the click operation is detected. For example, if the cursor 125 is located at the coordinate position B0 in the virtual touch area 120A before the click operation, when the user performs the click operation, the touch device 130 detects the click operation, and the processor 150 performs the click operation, the cursor 125 stays in the coordinate position B0 in the virtual touch area 120A.

In some embodiments, when the sliding operation is detected within the touch area 140, the start point and the end point of the sliding operation on the touch area 140 are detected, and the position of the virtual touch area 120A/120B on the display device 110 is adjusted according to the distance and the direction between the start point and the end point. For example, if it is detected that the start point of the slide operation on the touch area 140 is the coordinate position A0 and the end point of the slide operation on the touch area 140 is the coordinate position A1 depending on the distance and the direction between the start point and the end point, the virtual touch area 120A is adjusted to the position of 120A', as illustrated in FIG. 1A. In order to segment the virtual touch area 120A and the virtual touch area 120A', the virtual touch area 120A' is shown in dotted lines, but herein only the difference in the position of the virtual touch area 120A on the display device 110 is indicated, the display mode of the virtual touch area is not indicated. When the virtual touch area 120A changes the position on the display device 110 with the sliding operation, the position of the cursor 125 also changes. For example, when the virtual touch area 120A moves to the position of 120A', the cursor 125 also moves from the coordinate position B0 to the coordinate position B0'. The above described coordinate position B0 and the coordinate position B0' are located at the same position in the virtual touch area 120A.

In some embodiments of the present disclosure, the processor 150 may be a server, a circuit, a central processing unit, a central processing unit (CPU), a microprocessor (MCU), or other device having the function of storing, calculating, data reading, signal or information receiving, signal or information transmitting, or other equivalent functionality.

In some embodiments of the present invention, the display device 110 may be a circuit having a display function or other device or circuit having an equivalent function. In some embodiments of the present invention, the touch device 130 may be a circuit having a touch detection function or other device or circuit having an equivalent function.

Based on the aforementioned embodiments, the present disclosure provides a cursor control method and a cursor control system, and in particular, a cursor control method and a cursor control system for click operation of the cursor, so as to effectively save the user's wrist movement and operation time when the user is performing mouse moving and click operation. Especially when the user is performing a number of different locations of the click operation, the present disclosure may effectively save the user's wrist action and operating time.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one unit from another. For example, a first unit could be termed a second element, and, similarly, a second unit could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cursor control method applicable for a touch device and a display device, wherein the display device comprises a virtual touch area corresponding to a touch area of the touch device, wherein the control method comprising:
    detecting a click coordinate position in the touch area during a click operation;
    calculating a virtual click coordinate position corresponding to the click coordinate position in the virtual touch area; and
    performing the click operation at the virtual click coordinate position on the display device;
    wherein calculating the virtual click coordinate position corresponding to the click coordinate position in the virtual touch area comprises:
    setting a virtual origin in the virtual touch area corresponding to an origin in the touch area;
    calculating a distance and a direction of the click coordinate position corresponding to the origin; and
    calculating the virtual click coordinate position according to the direction, the distance, the virtual origin, and of the virtual touch area corresponding to the touch area.

2. The cursor control method of claim 1, further comprising:
    adjusting a proportion of the virtual touch area corresponding to the touch area.

3. The cursor control method of claim 1, further comprising:
    displaying the virtual touch area on a screen of the display device.

4. The cursor control method of claim 3, wherein calculating the virtual click coordinate position corresponding to the click coordinate position in the virtual touch area comprises:
    setting a value of the click coordinate position to be a value of the virtual click coordinate position.

5. The cursor control method of claim 1, wherein a cursor displayed on the display device remains at a position before the click operation is detected.

6. The cursor control method of claim 1, further comprising:
    detecting a start point and an end point in the touch area when a slide operation is detected in the touch area; and
    adjusting a position of the virtual touch area on the display device according to a distance and a direction between the start point and the end point.

7. The cursor control method of claim 6, wherein setting the virtual origin in the virtual touch area corresponding to the origin in the touch area comprises:
    detecting an end point of the slide operation on the touch area when the slide operation is detected at the touch area;
    setting the end point to be the origin; and
    setting a coordinate of a cursor displayed in the virtual touch area of the display device as the virtual origin at an end of the slide operation.

8. The cursor control method of claim 1, wherein setting the virtual origin in the virtual touch area corresponding to the origin in the touch area comprises:
    setting a coordinate in the touch area as the origin, wherein the coordinate in the touch area is a position where a user most frequently clicks; and
    setting a coordinate of a cursor displayed in the virtual touch area of the display device before the click operation as the virtual origin.

9. A cursor control system, comprising:
    a touch device configured to detect a click coordinate position in a touch area of the touch device during a click operation;
    a display device comprising a virtual touch area corresponding to the touch area of the touch device; and
    a processor configured to calculate a virtual click coordinate position corresponding to the click coordinate position in the virtual touch area and performing the click operation on the virtual click coordinate position on a screen of the display device;
    wherein the processor is further configured to set a virtual origin in the virtual touch area corresponding to an origin in the touch area, calculate a distance and a direction of the click coordinate position corresponding to the origin, and calculate the virtual click coordinate position according to the direction, the distance, the virtual origin, and a proportion of the virtual touch area corresponding to the touch area.

* * * * *